United States Patent
Manabe et al.

(10) Patent No.: US 8,469,136 B2
(45) Date of Patent: Jun. 25, 2013

(54) HYBRID CONSTRUCTION MACHINE

(75) Inventors: Tetsunori Manabe, Hiroshima (JP); Takao Sugano, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 355 days.

(21) Appl. No.: 12/856,176

(22) Filed: Aug. 13, 2010

(65) Prior Publication Data

US 2011/0073402 A1 Mar. 31, 2011

(30) Foreign Application Priority Data

Sep. 29, 2009 (JP) ................................. 2009-224627

(51) Int. Cl.
*B60K 5/08* (2006.01)

(52) U.S. Cl.
USPC ........................... 180/291; 180/377; 180/312

(58) Field of Classification Search
USPC .................. 180/291, 374, 377, 367, 381, 382, 180/311, 312; 296/1.03, 204
See application file for complete search history.

(56) References Cited

U.S. PATENT DOCUMENTS

| | | | | |
|---|---|---|---|---|
| 1,944,248 A | * | 1/1934 | Lee et al. | 180/292 |
| 3,236,326 A | * | 2/1966 | Reynolds | 180/292 |
| 4,889,207 A | * | 12/1989 | von Broock | 180/291 |
| 6,223,850 B1 | * | 5/2001 | Rajca et al. | 180/377 |
| 6,397,965 B1 | * | 6/2002 | McFarlane et al. | 180/298 |
| 6,415,884 B1 | * | 7/2002 | Hawener et al. | 180/291 |
| 7,032,701 B2 | * | 4/2006 | Yoshida et al. | 180/291 |
| 7,575,088 B2 | * | 8/2009 | Mir et al. | 180/300 |
| 7,690,455 B2 | * | 4/2010 | Kano et al. | 180/65.235 |
| 2004/0098983 A1 | * | 5/2004 | Naruse et al. | 60/428 |
| 2005/0205335 A1 | * | 9/2005 | Reed et al. | 180/292 |
| 2006/0289221 A1 | * | 12/2006 | Reese et al. | 180/291 |
| 2007/0199742 A1 | * | 8/2007 | Miyahara et al. | 180/58 |
| 2009/0199553 A1 | * | 8/2009 | Nishimura et al. | 60/486 |

FOREIGN PATENT DOCUMENTS

| | | |
|---|---|---|
| EP | 0 637 533 A1 | 2/1995 |
| JP | 2002-227241 | 8/2002 |
| JP | 2003-90387 | 3/2003 |
| JP | 2005-155251 A | 6/2005 |

OTHER PUBLICATIONS

Chinese Office Action issued Aug. 28, 2012 in Patent Application No. 201010287211.X (with partial English translation).

* cited by examiner

*Primary Examiner* — John Walters
*Assistant Examiner* — Brian Swenson
(74) *Attorney, Agent, or Firm* — Oblon, Spivak, McClelland, Maier & Neustadt, L.L.P.

(57) ABSTRACT

A hybrid construction machine includes an engine, a generator motor, and a hydraulic pump. They constitute a power unit, and are connected in series, with the generator motor being disposed between the engine and the hydraulic pump and with a center of gravity of the entire power unit being positioned closer to the generator motor than the center of gravity of the engine. A mount installation bracket is mounted at a side of each flange disposed at a corresponding side of the generator motor. A generator-motor-side mount device is mounted to the bracket.

3 Claims, 4 Drawing Sheets

HYBRID CONSTRUCTION MACHINE

BACKGROUND OF THE INVENTION

1. Field of the Invention

The present invention relates to a hybrid construction machine in which a power unit is formed by connecting three devices, that is, an engine, a generator motor, and a hydraulic pump in series with each other.

2. Description of the Related Art

As shown in FIG. 5, in an excavator, an upper rotating structure 2, disposed on a crawler-type lower traveling structure 1, is mounted so as to be rotatable around a vertical axis that is perpendicular to the ground, and a working attachment 3 is mounted to a front portion of the upper rotating structure 2.

A cabin 5, a counterweight 6, and an engine room 7 are provided at the upper rotating structure 2. The cabin 5 is provided at the left side of a front portion of an upper frame 4 serving as a base. The counterweight 6 is provided at a back end portion of the upper frame 4. The engine room 7 is provided at a back portion (forwardly of the counterweight 6) of the upper rotating structure 2. An engine 8 is set as a power source in a left-right direction in the engine room 7.

In the specification, "front/back" and "left/right" are defined as viewed from an operator sitting in the cabin 5.

FIG. 6 shows an arrangement of devices in an engine room 7 of a hydraulic excavator having only an engine 8 as a power source, as viewed from a back side of a machine.

In the hydraulic excavator, as in the illustration, a power unit U1 is formed by connecting a hydraulic pump 9 in series with the engine 8. Reference numeral 10 denotes a cooling fan directly connected to the engine 8.

In the power unit U1 of the hydraulic excavator, a center of gravity X1 of the entire unit when viewed from the back side (or a front side) is slightly displaced towards the pump from an engine center of gravity X2.

As a mounting structure that supports the power unit U1 on a body frame (upper frame 4) of the machine, mount devices 11 and 12 are provided on respective sides of the center of gravity X1 of the power unit in an axial direction.

More specifically, the mount device at one side (hereunder referred to as the "left mount device" in accordance with directions defined in FIG. 6) 11 is provided at the engine 8. The mount device at the other side (hereunder referred to as the "right mount device" in accordance with directions defined in FIG. 6) 12 is provided at a fly wheel housing 13 accommodating a fly wheel.

The mount devices 11 and 12 each include a vibration absorbing mechanism that attenuates vibration by a resilient member such as rubber or a spring.

In this mounting structure, the distance between the center of gravity X1 of the power unit and one of supporting points and the distance between the center of gravity X1 of the power unit and the other of the supporting points are substantially equal to each other. Accordingly, the overall weight of the power unit U1 is substantially equally shared by the mount devices 11 and 12 at both sides.

The power unit mounting structure in the hydraulic excavator is discussed in Japanese Unexamined Patent Application Publication No. 2003-90387 (Patent Document 1).

In a hybrid excavator using both motive power and electric power, as shown in FIG. 7, a power unit U2 is formed by providing a generator motor 14 between an engine 8 and a hydraulic pump 9. The generator motor 14 operates as an electric generator and an electric motor.

An engine-side flange 15 and a pump-side flange 16 are provided on the left and right of the generator motor 14, respectively, so as to project towards the outer periphery while they act as end covers.

The flanges 15 and 16 are formed of thick plates, respectively. The engine-side flange 15 is connected to a fly wheel housing 13 at the engine 8, and the pump-side flange 16 is connected to the hydraulic pump 9.

The entire structure of the hybrid excavator is discussed in Japanese Unexamined Patent Application Publication No. 2002-227241 (Patent Document 2).

In the power unit U2 of the hybrid excavator, as in the illustration, a center of gravity X3 of the power unit is shifted considerably towards the hydraulic pump 9 from the center of gravity X1 of the power unit U1 for the hydraulic excavator in accordance with the addition of the generator motor 14.

Therefore, if the mounting structure provided on the basis of the specification of the hydraulic excavator shown in FIG. 6 is used as it is in the hybrid excavator, the distance between the center of gravity X3 of the power unit and one of supporting points and the distance between the center of gravity X3 of the power unit and the other of the supporting points differ greatly. Therefore, the stability of a supporting state becomes extremely poor.

More specifically, since an unbalanced load acts, for example, the left mount device may have insufficient strength due to an increase in load on the left mount device 11, or vibration may tend to occur.

The generator motor 14 is not directly supported. Therefore, its own weight and the weight of the hydraulic pump act upon the generator motor 14. Consequently, a force is forcefully generated at an internal structure through a rotary shaft, thereby adversely affecting the durability and performance of the generator motor 14.

SUMMARY OF THE INVENTION

Accordingly, it is an object of the present invention to provide a hybrid construction machine that can stably support a power unit at both sides thereof that are at substantially equal distances from the center of gravity of the power unit, and that can reduce a load exerted upon a generator motor.

According to an aspect of the present invention, there is provided a hybrid construction machine comprising an engine, a generator motor, a hydraulic pump, all of which constitute a power unit, and are connected in series, with the generator motor being disposed between the engine and the hydraulic pump and with a center of gravity of the entire power unit being positioned closer to the generator motor than a center of gravity of the engine. On this presupposition, mount devices are disposed at the engine and the generator motor, respectively, with the center of gravity of the entire power unit being disposed therebetween. In addition, the power unit is supported on a body frame of the machine by the mount devices. Therefore, it is possible to stably support the power unit with the distance between the center of gravity of the power unit and the mount device at one side and the distance between the center of gravity of the power unit and the mount device at the other side being substantially equal to each other.

This makes it possible to substantially equalize a load on the mount devices at both sides to overcome the possibility of insufficient strengths of the mount devices, and to reduce vibration.

Since the generator motor is directly supported by the mount device, it is possible to reduce a load applied to the generator motor, and to protect an internal structure, so that actual performance and durability can be ensured.

According to the present invention, in the above-described structure, it is desirable that an engine-side flange connected to the engine be provided at one side of the generator motor in an axial direction thereof, a pump-side flange connected to the hydraulic pump be provided at the opposite side, a mount installation bracket be provided at a side of each of the flanges, and the generator-motor-side mount device be mounted to the mount installation bracket.

According to the present invention, in the above-described structure, it is desirable that a plurality of the mount installation brackets and a plurality of the generator-motor-side mount devices be provided at respective sides of the power unit in a direction perpendicular to an axial direction of the power unit.

In this case, since the mount devices at the generator motor are provided at respective sides of the power unit in a direction perpendicular to the axial direction of the power unit (front-back direction in the excavator shown in FIG. 5), it is possible to further stabilize a supporting state of the entire power unit and the generator motor.

According to the present invention, in the above-described structure, it is desirable that the hybrid construction machine further comprise an engine-side suspension part and a generator-motor-side suspension part for suspending the entire power unit, that the generator-motor-side suspension part be provided at the mount installation bracket.

In this case, since the entire power unit can be suspended with the suspension parts at the engine and the generator motor, it is possible to transport the power unit as one assembly and install it on a machine. Therefore, it is possible to enhance transportability and increase assembly work efficiency.

Further, in this case, since the suspension part at the generator motor is provided at a mount installation bracket, that is, since a suspension point at one side of the power unit in the axial direction is set at the generator motor, the power unit can be suspended in a well-balanced state at both sides thereof that are at substantially equal distances from the center of gravity of the power unit.

Still further, since the suspension parts are formed as parts of the mount installation brackets, costs are reduced and assembly is facilitated.

In the above-described desirable cases, the mount installation brackets are installed on both the engine-side flange and the pump-side flange originally provided at the generator motor, and the mount device at the generator motor side is provided at the bracket, it is possible to increase the strength of the mount devices themselves for stabilizing a supporting state of the power unit, and to use the flanges at both sides as mount device installation members to reduce costs, facilitate assembly, and increase space efficiency.

DESCRIPTION OF THE PREFERRED EMBODIMENTS

An embodiment of the present invention will be described with reference to FIGS. 1 to 4.

In the embodiment, the present invention is applied to a hybrid excavator.

Figure 1:
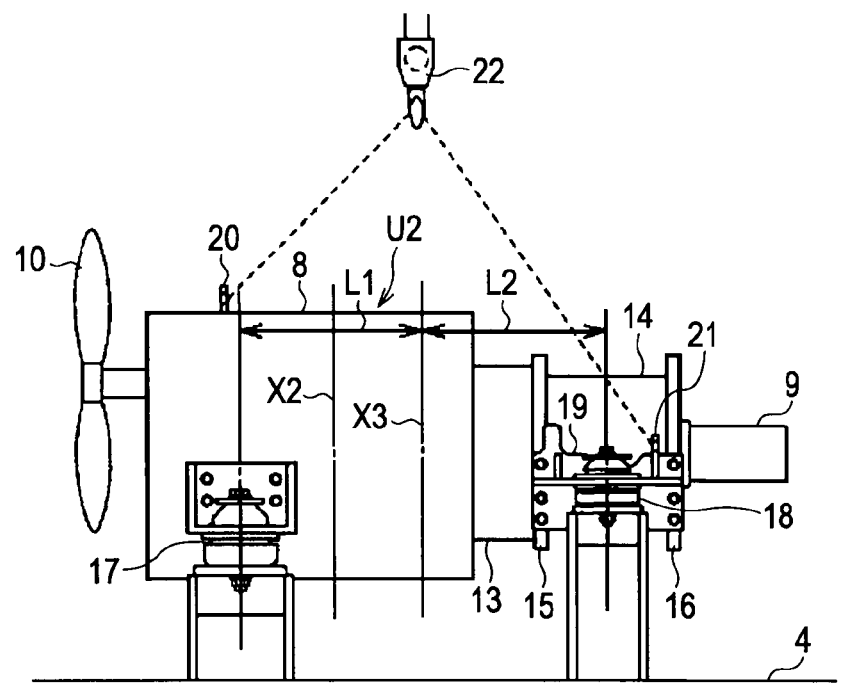
FIG. 1 shows a supporting state of a power unit according to an embodiment of the present invention, as viewed from a back side of a machine.
Figure 7:
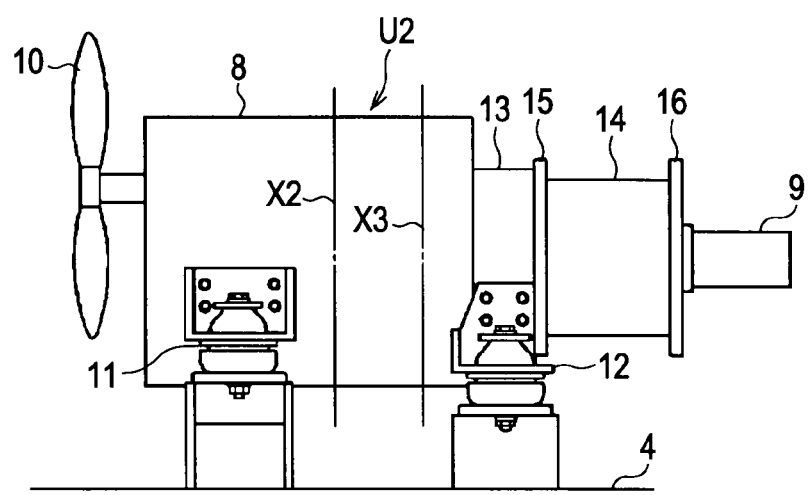
FIG. 7 corresponds to FIG. 6 and shows a case in which a supporting structure of the power unit for the hydraulic excavator is applied to a hybrid excavator.

Similarly to FIG. 7, FIG. 1 shows a power unit in an engine room and a supporting structure thereof, as viewed from a back side of a machine.

Figure 6:
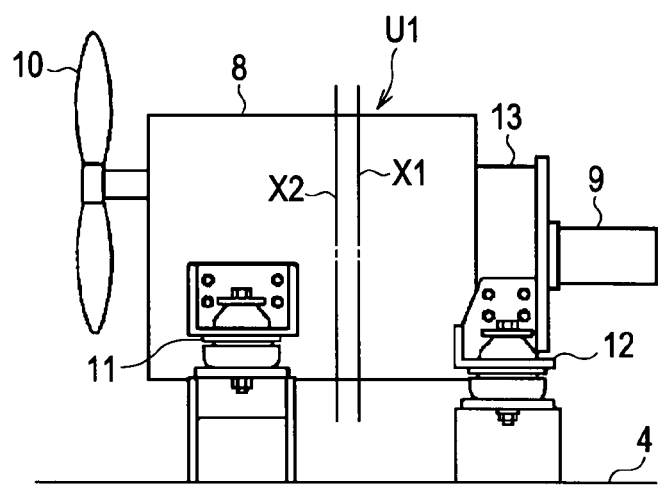
FIG. 6 corresponds to FIG. 1 and shows a supporting state of a power unit for a hydraulic excavator.

FIG. 1 shows that (I) a power unit U2 is formed by providing a generator motor 14 between an engine 8 and a hydraulic pump 9, (II) an engine-side flange 15 and a pump-side flange 16, which have the form of thick plates, are provided on the left and right of the generator motor 14, respectively, so as to project towards the outer periphery while they act as end covers; and the engine-side flange 15 is connected to a fly wheel housing 13 at the engine 8, and the pump-side flange 16 is connected to the hydraulic pump 9, and (III) a center of gravity X3 of the power unit is shifted considerably towards the hydraulic pump from the center of gravity X1 of the hydraulic excavator power unit U1 (shown in FIG. 6). The features of (I) to (III) are the same as those of the related art shown in FIG. 7 (when a supporting structure of the hydraulic shovel power unit U1 shown in FIG. 6 is applied to the hybrid excavator power unit U2).

As a mounting structure of the power unit U2, mount devices 17 and 18, each including a vibrating absorbing structure, are provided on respective sides of the center of gravity X3 of the power unit in an axial direction. Hereunder, the mount devices 17 and 18 will be referred to as the "left mount devices 17" and the "right mount devices 18 as viewed from the back side of the machine. By the mount devices 17 and 18, the entire power unit 2 is supported on an upper frame 4.

As with the left mount device 11 in the related art shown in FIG. 7, of the mount devices 17 and 18, the left mount devices 17 are provided at an end portion of the engine 8 opposite to the pump (that is, on the left of a center of gravity X2 of the engine).

The right mount devices 18 are mounted to a generator motor 14 through mount installation brackets 19.

Figure 2:
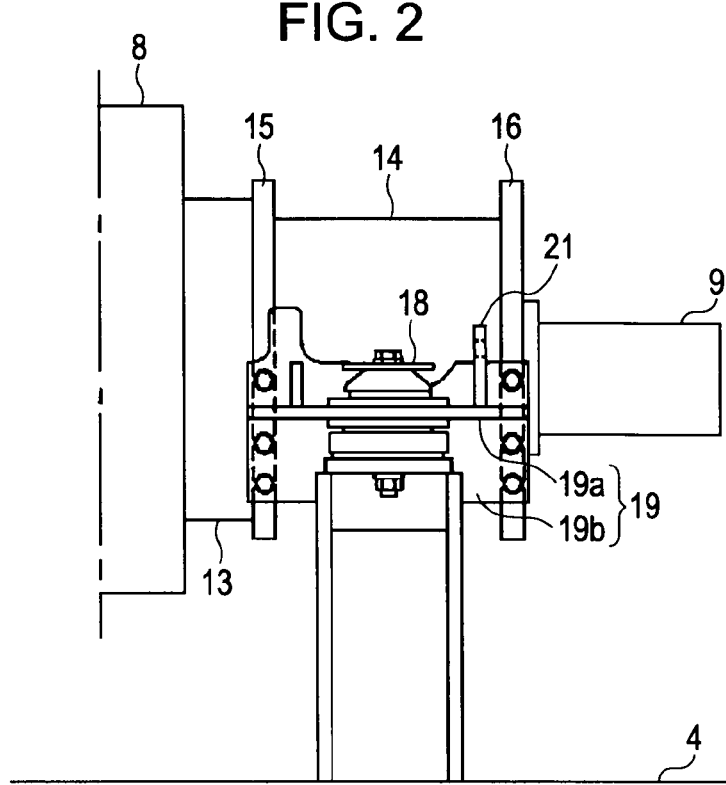
FIG. 2 is an enlarged view of a portion of FIG. 1.
Figure 3:
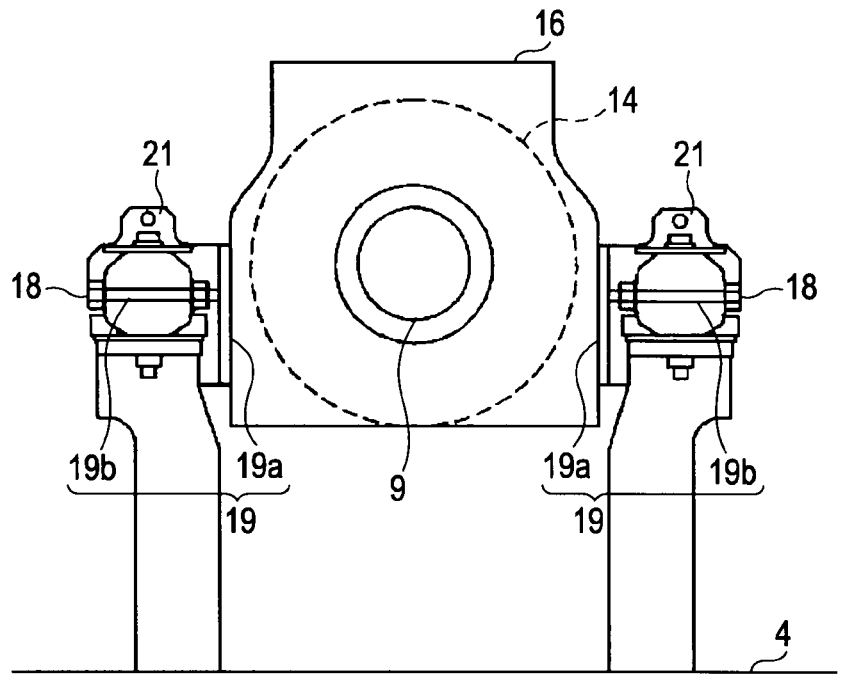
FIG. 3 is a side view of FIG. 2 as viewed from a pump.
Figure 4:
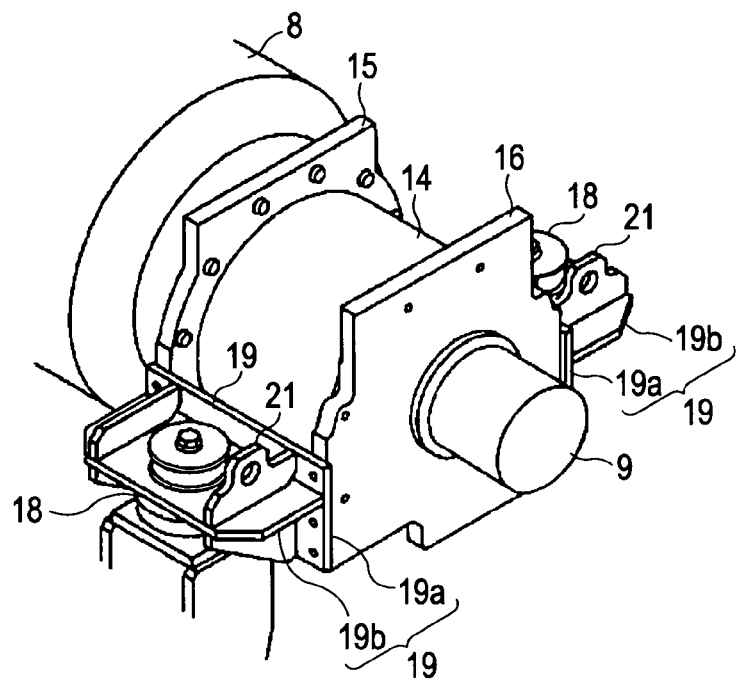
FIG. 4 is a perspective view of a portion of the power unit and a portion of a mounting structure.
Figure 5:
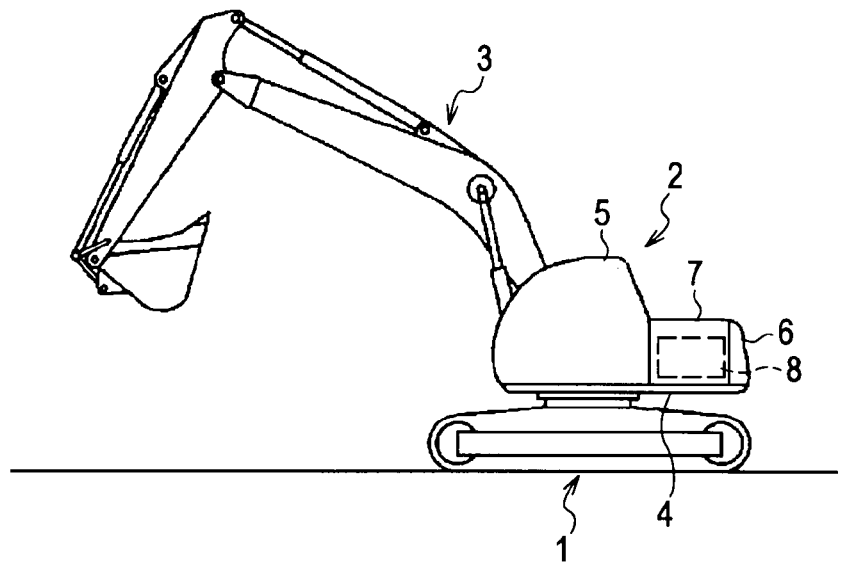
FIG. 5 is a schematic side view of an excavator serving as an example to which the present invention is applied.

In detail, as shown in FIGS. 2 to 4, the mount installation brackets 19 each include a vertical plate portion 19a and a horizontal plate portion 19b. The vertical plate portions 19a are mounted on respective sides of each of the flanges 15 and 16 at both sides of the generator motor 14. The right mount devices 18 are mounted to substantially the center of the horizontal plate portions 19b (that is, at substantially the center in an axial direction of the generator motor 14).

It is desirable that the positions where the right mount devices are mounted substantially match the center of gravity of the generator motor 14.

As shown in FIGS. 3 and 4, the mount installation brackets 19 are mounted to front and back side surfaces of each of the flanges 15 and 16. The right mount devices 18 are mounted to the brackets 19.

That is, the right mount devices 18 are provided at respective sides of the power unit U2 in a direction perpendicular to an axial direction thereof (that is, in a front-back direction) so as to be symmetrical or substantially symmetrical with respect to the center of the generator motor.

According to the power unit supporting structure, it is possible to stably support the power unit U2 by setting a distance L1 between the power-unit center of gravity X3 and the mount devices 17 and a distance L2 between the power-unit center of gravity X3 and the mount devices 18 substantially equal to each other.

This makes it possible to substantially equalize a load on the mount devices 17 and 18 at both sides. For this reason, it is possible to eliminate an unbalanced load to overcome the possibility of insufficient strengths of the mount devices 17 and 18, and to reduce vibration.

Since the generator motor 14 is directly supported by the mount devices 18, it is possible to reduce a load applied to the generator motor 14, and to protect an internal structure, so that actual performance and durability can be ensured.

In this case, since the mount installation brackets 19 are mounted to each of the engine-side flange 15 and the pump-side flange 16 originally provided at the generator motor 14, and the mount devices 18 at the generator motor are provided at the respective brackets 19, it is possible to increase the strengths of the mount devices 18 themselves to further stabilize a supporting state of the entire power unit.

More specifically, it is possible to increase the strengths of the mount devices 18 by (a) firmly mounting the brackets 19 to the generator motor 14 in a doubly supported state, (b) using the flanges 15 and 16 as strength members constituting parts of the mount devices 18, and (c) forming the flanges 15 and 16 in the form of thick plates originally having sufficient strength so that the flanges 15 and 16 can be firmly connected to the engine 8 and the hydraulic pump 9. This makes it possible to stabilize a supporting state of the power unit U2.

Moreover, since the already existing flanges 15 and 16 are used as mount installation members, costs are reduced, assembly is facilitated, and space efficiency is increased.

As suspension parts for suspending the power unit U2, an engine-side suspension part 20 is provided at an upper surface of an end portion opposite to the pump of the engine 8, and generator-motor-side suspension parts 21 and 21 are provided at the horizontal plate portions 19a and 19b of the respective mount installation brackets 19 and 19.

As shown in FIG. 1, the suspension parts 20, 21, and 21 make it possible to suspend the entire power unit U2 at three suspension points with, for example, a crane 22 (only its hook is shown). For this reason, it is possible to transport the power unit U2 as one assembly and install it on a machine. Therefore, it is possible to enhance transportability and increase assembly work efficiency.

In this case, since the suspension parts 21 and 21 at the generator motor are provided at the mount installation brackets 19 and 19, that is, since a suspension point at one side (right side) of the power unit U2 in the axial direction is set at the generator motor 14, the power unit U2 can be suspended in a well-balanced state with the distance between the center of gravity X3 and one side of the power unit U2 and the distance between the center of gravity X3 and the other side of the power unit U2 being substantially the same.

Since the suspension parts 21 are formed as parts of the mount installation brackets 19, costs are reduced and assembly is facilitated.

Other Embodiments (1) Although, in the embodiment, the generator-motor-side mount devices 18 are provided at the front and back sides of the generator motor 14, one mount device 18 may be provided at a lower surface of the generator motor 14.

In this case, the mount installation brackets 19 are mounted to respective sides of a lower surface of each of the flanges 15 and 16.

In addition, when the mount devices 18 (the mount installation brackets 19) are provided on the front and back sides, or when the mount device 18 is provided at only one location of the lower surface, the mount devices 18 or the mount device 18 may be mounted to a housing of the generator motor 14 instead of on both sides of each of the flanges 15 and 16.

(2) The generator-motor-side suspension parts 21 may be provided at the housing of the generator motor 14 or at one of the flanges 15 and 16 (desirably, at the pump-side flange 15).

(3) The present invention is not limited in its application to a hybrid excavator. The present invention may be widely applied to hybrid construction machines such as crushing machines and separating machines that are formed by converting excavators.

Although the invention has been described with reference to the preferred embodiments in the attached figures, it is noted that equivalents may be employed and substitutions made herein without departing from the scope of the invention as recited in the claims.

What is claimed is:

1. A hybrid construction machine comprising:
an engine;
a generator motor;
a hydraulic pump;
an engine-side mount device; and
a generator-motor-side mount device,
wherein the engine, the generator motor, and the hydraulic pump constitute a power unit,
wherein the engine, the generator motor, and the hydraulic pump are connected in series, with the generator motor being disposed between the engine and the hydraulic pump and with a center of gravity of the entire power unit being positioned closer to the generator motor than is a center of gravity of the engine,
wherein the engine-side mount device and the generator-motor-side mount device are disposed at the engine and the generator motor, respectively, with the center of gravity of the entire power unit being disposed therebetween, and
wherein the power unit is supported on a body frame of the machine by the mount devices, and
wherein an engine-side flange connected to the engine is provided at one side of the generator motor in an axial direction thereof,
wherein a pump-side flange connected to the hydraulic pump is provided at the opposite side of the generator motor in the axial direction thereof,
wherein a mount installation bracket extends between the engine-side flange and the pump-side flange and is mounted to both the engine-side flange and the pump-side flange, and
wherein the generator-motor-side mount device is mounted to the mount installation bracket.

2. The hybrid construction machine according to claim 1, wherein a plurality of the mount installation brackets and a plurality of the generator-motor-side mount devices are provided at respective sides of the power unit in a direction perpendicular to an axial direction of the power unit.

3. The hybrid construction machine according to claim 1, further comprising an engine-side suspension part and a generator-motor-side suspension part for suspending the entire power unit, wherein the generator-motor-side suspension part is provided at the mount installation bracket.

* * * * *